US008477367B2

(12) United States Patent
Nagarajan et al.

(10) Patent No.: US 8,477,367 B2
(45) Date of Patent: Jul. 2, 2013

(54) SYSTEM AND METHOD FOR SELECTIVELY PRINTING COLOR CONTENT OF A PAGE WITH A REDUCED COLOR GAMUT AND BILLING BASED ON PRINTED CONTENT

(75) Inventors: Ramesh Nagarajan, Pittsford, NY (US); Andrew Joseph Zipprich, Walworth, NY (US); Robert Eero Nuuja, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1306 days.

(21) Appl. No.: 11/931,087

(22) Filed: Oct. 31, 2007

(65) Prior Publication Data

US 2009/0109454 A1 Apr. 30, 2009

(51) Int. Cl.
*G06K 1/00* (2006.01)
*G06K 9/00* (2006.01)
*G03G 15/01* (2006.01)
*B41J 35/16* (2006.01)
*G09G 5/20* (2006.01)

(52) U.S. Cl.
USPC ........... 358/1.9; 358/2.1; 358/3.01; 358/1.13; 358/1.18; 358/500; 358/504; 358/515; 358/518; 382/162; 382/164; 382/167; 382/254; 382/112; 399/27; 399/28; 399/54; 399/79; 399/112; 347/15; 347/43; 347/115; 347/177; 347/178; 345/589; 345/590; 345/591; 345/593

(58) Field of Classification Search
USPC ................. 358/1.9, 2.1, 30.1, 1.1, 1.13, 1.18, 358/500, 501, 504, 512, 515, 517–519, 521, 358/525, 534, 302, 448; 382/162–167, 254, 382/232, 229, 112; 345/589, 590, 591, 593, 345/596, 597, 600, 604; 347/43, 15, 24, 100
See application file for complete search history.

(56) References Cited

U.S. PATENT DOCUMENTS

| 5,822,451 | A | 10/1998 | Spaulding |
| 5,850,474 | A | 12/1998 | Fan et al. |
| 6,064,838 | A | 5/2000 | Maruta |
| 6,240,205 | B1 | 5/2001 | Fan et al. |
| 6,356,359 | B1 | 3/2002 | Motamed |
| 6,385,675 | B1 | 5/2002 | Yamaguchi |
| 6,574,443 | B1 | 6/2003 | Butikofer |
| 6,972,857 | B2 * | 12/2005 | Mantell et al. ............... 358/1.14 |
| 7,277,191 | B2 * | 10/2007 | Metcalfe et al. ............. 358/1.12 |
| 7,340,482 | B2 | 3/2008 | Abhyankar |
| 2002/0075493 | A1 | 6/2002 | Harrington |
| 2003/0002087 | A1 * | 1/2003 | Metcalfe et al. ............. 358/462 |
| 2003/0020951 | A1 | 1/2003 | Minowa |
| 2006/0020561 | A1 | 1/2006 | Kodimer |
| 2006/0074816 | A1 | 4/2006 | Hibara |
| 2006/0114494 | A1 * | 6/2006 | Crosby et al. ................ 358/1.15 |
| 2006/0114497 | A1 | 6/2006 | Anderson |

(Continued)

FOREIGN PATENT DOCUMENTS

JP 2005-94397 * 7/2005

*Primary Examiner* — Steven Kau
(74) *Attorney, Agent, or Firm* — Fay Sharpe LLP

(57) ABSTRACT

A system and related method for selectively printing color content of a page with a reduced color gamut are provided. The system includes a detection module, a printing mode module, and a conversion module. The detection module is configured to detect a color object in the page and the printing mode module exists in at least one mode. The conversion module can selectively convert the detected color object to a converted reduced-colorant object in accordance with the existence of the at least one mode of the printing mode module.

25 Claims, 4 Drawing Sheets

U.S. PATENT DOCUMENTS

| | | |
|---|---|---|
| 2006/0203277 A1 | 9/2006 | Suzuki |
| 2007/0058188 A1* | 3/2007 | Nakahara ..................... 358/1.13 |
| 2007/0279658 A1* | 12/2007 | Ito et al. ......................... 358/1.9 |
| 2009/0099980 A1 | 4/2009 | Ni |
| 2009/0265286 A1 | 10/2009 | Nagarajan |
| 2010/0005038 A1 | 1/2010 | Nagarajan |

* cited by examiner

*FIG. 1A*

White Paper - PDF/A  Page 7 of 9

→ Using the Standard

Obtaining a Copy
The ISO 19005-1 Standard can be purchased from the ISO website (http://www.iso.org). Copies can be ordered in paper or in PDF format and, like all other ISO Standards, they are protected by copyright. For this reason you will not find free copies on the internet and, if you do, they are probably not legally being made available. The Standard is currently only available in English.

Who should read the PDF/A Standard
PDF/A format is meant to support and enhance a good archiving strategy. The Standard itself is quite technical and will probably only be fully understood by someone with considerable knowledge in PDF technology, especially since the PDF Reference must also be understood. Just the PDF Reference 1.4 alone contains almost 1000 pages, not taking into account all of the additional documents that it references like Fonts, XML, RFCs etc. In addition, PDF/A alone does not guarantee long-term archiving. A good approach is to enlist an expert who will help you understand the requirements of PDF/A, determine how to implement PDF/A into your archiving strategy, and explain what steps you need to take to ensure your overall archiving goals can be met.

> The PDF/A Standard (ISO 19005-1) can be obtained at: www.iso.org.
>
> PDF/A is complex: alone the PDF Reference 1.4 has almost 1000 pages.

What tools are available?
Tools for supporting the PDF/A format (creation or analysis of PDF/A) are not yet on the market, but it shouldn't take long. With Adobe Acrobat 7 you can print to "PDF/A: Draft" format, however you will not necessarily have a PDF/A compliant document. Adobe Acrobat 7 was released before the PDF/A Standard was finalized and does not ensure compliance with all required elements. Expect to see numerous plug-ins and stand-alone products in the next year that will allow you to create PDF/A documents from original files. Microsoft has announced the possibility of creating PDF/A compliant files directly from their new office products. It will be extremely important to properly verify if PDF/A documents really are compliant, due to the large number of creator products.

PDF/A requires a complete solution
PDF/A is only part of a complete archiving solution. PDF/A alone does not guarantee long-term archiving and it does not guarantee that information will be displayed as desired. PDF/A also does not claim that a PDF-based archive is always the best solution. However, if you decide to use PDF, than PDF/A defines a set of requirements that make long-term archiving possible.

Other aspects that must be taken into account when implementing a PDF/A-compliant archive include, for example, corporate standards and procedures, reliable data sources, reliable fonts, quality management and special individual requirements. The migration of current paper or TIFF-based archives to PDF/A compliant archives is not an insignificant task and must be well planned.

> PDF/A is only one element of a complete archiving strategy.
>
> PDF/A alone cannot guarantee long-term archiving, but it makes long-term archiving possible.

(c) 2006 PDF Tools AG - Premium PDF Technology

FIG. 1B

SYSTEM AND METHOD FOR SELECTIVELY PRINTING COLOR CONTENT OF A PAGE WITH A REDUCED COLOR GAMUT AND BILLING BASED ON PRINTED CONTENT

BACKGROUND

1. Technical Field

The present disclosure relates to printing content of a page, and, in particular, to a system and method for selectively printing color content of a page with a reduced color gamut.

2. Description of Related Art

Modern color printing systems mark a printing substrate with patterns of lines or small dots of oval or round shape onto the printing substrate (e.g., a page can be printed on a piece of paper). The color printing system can mark the printing substrate with multiple inks or toners with differing colors generally referred to as colorants. Although most color printing systems have only four available colorants of toner (or ink), a much wider variety of colors are available for perception because of physiological and psychophysical aspects of human vision.

The set of colors of toner (or ink) that are chosen to create the wider variety of perceived colors is generally referred to as the color gamut. The most typically used color gamut is the "CMYK" color gamut. The "C" refers to Cyan toner, the "M" refers to "Magenta" toner, the "Y" refers to the "Yellow" toner, and the "K" refers to the "Black" toner. Although there are only three types of color receptors in the human eye (and one additional type of receptor for night vision), four toner colors are generally used because black toners are cheaper, and it is more efficient to use a black toner than to combine the cyan, magenta, and yellow toners to make a black color, e.g., a black toner dries faster than when combing the three aforementioned toners to make a black marking on the substrate. The cost of the toner (or ink) should be taken into consideration when printing color and/or monochrome pages.

However, the cost of the toner is usually only about 20% to 30% of the averaged marginal cost of printing a single page (e.g., a page can be printed on the substrate), and it is more expensive to print color pages rather than monochrome pages. Additionally, it is more expensive to print color pages than to print pages using a reduced color gamut, e.g., using only cyan, magenta, and black colorants. The dominant cost of the total marginal cost of printing a page is that particular page's proportionate service cost. Additionally, the service cost varies depending upon the content of the page. The service cost includes technician costs, repair costs, IT infrastructure costs, field offices costs, managers' and engineers' salaries, parts costs, labor costs, and the like.

The business model employed by many entities involved in color printing includes charging one fee for printing a monochrome page and another fee for printing a color page. The color pages are charged at a higher rate when compared to printing monochrome pages partly because of the increased service cost. This fee is sometimes referred to as a "per click" fee. This "per click" fee is an additional fee that is applied to each particular piece of printed page that attempts to account for the service cost. The per click service fee includes an estimated toner cost, a risk premium cost, and (depending on the arrangement) a profit margin. The risk premium cost is an estimated service cost that a particular piece of printing substrate will probabilistically cause a party to incur a service expense. Printing a color page has a significantly higher probability of incurring additional service costs as compared to printing a monochrome page.

However, the traditional "per click" fee is simply one of two predetermined fixed fees. When a user prints a purely monochrome page the per click fee is considered to be one rate and a different rate when printing a color page. This is sometimes referred to as the "one size fits all billing approach" and is simply billing one fee for printed monochrome pages and another fee for printed color pages, regardless of the content in the printed page. For example, the "per click" fee may be $0.01 (U.S) per monochrome printed page and $0.08 (U.S.) per color printed page.

The "one size fits all billing approach" doesn't generally take into account the objects that are in the page but only if the page is printed wholly in color or wholly in monochrome. For example, there are several types of objects that may be included in a page. Some of the types of objects that may be part of a page are: monochrome contone objects, color contone objects, monochrome text objects, color text objects, monochrome line art objects, color line art objects, monochrome graphic objects, color graphic objects, monochrome low frequency halftone objects, color low frequency halftone objects, monochrome high frequency halftone objects, color high frequency halftone objects, monochrome solid fill objects, and color solid fill objects. The service costs associated with the several objects vary. Additionally, any color objects may be printed (or contained within a page) using only two, or three colorants forming two-colorant objects, and three-colorant objects, respectively.

SUMMARY

The present disclosure relates to printing content of a page, and, in particular, to a system and method for selectively printing color content of a page with a reduced color gamut.

In an aspect of the present disclosure, a system for selectively printing color content of a page with a reduced color gamut includes a detection module, a printing mode module, and a conversion module. The detection module can detect a color object in the page and the printing mode module can exist in a mode (or multiple modes). The conversion module can selectively convert the detected color object to a converted reduced-colorant equivalent object that uses less ink/toner based upon the existence of a mode (or modes) of the printing mode module. The converted reduced-colorant object may be a monochrome object, a two-colorant object, or a three-colorant object. The page referred to may be a scanned page, an image of a page, a page description language page, a printed page, a copied page, a computer-memory based page, a hard-drive based page, a raster page, and a vector graphics page. Additionally or alternatively, the converted reduced-colorant object may be in a windowed region of the page that is determined during autowindowing on the page The printing mode module can exist in one or more of the following modes: a reduced-colorant only mode, a full color mode, a color text mode, a color line art mode, a color line art and text mode, a color graphics mode, and a color solid fill mode, however, the reduced-colorant only mode and the full color mode may be exclusive to other modes.

Additionally, the detection module may be configured to detect several types of color objects. The detection module can detect color contone objects, color text objects, color line art objects, color graphic objects, color low frequency halftone objects, color high frequency halftone objects, and color solid fill objects.

The conversion module acts in accordance with the printing mode module. When the printing mode module exists in a reduced-colorant only mode, the conversion module converts the detected color object to the converted reduced-colorant object regardless of the type of the detected color object. However, when the printing mode module exists in a full color mode, the conversion module does not convert the detected color object (or any of the other detected color objects) to a converted reduced-colorant object. Additionally or alternatively, the conversion module may be non-functional during the full color mode.

The printing mode module can exist in a color text mode as well. When the printing mode module exists in the color text mode the conversion module does not covert a detected color object to a converted monochrome object when the detected color object is a color text object. Additionally or alternatively, when the printing mode module exists in a color line art mode, the conversion module does not covert a detected color object to a converted reduced-colorant object when the detected color object is a color line art object.

The system can also use a color line art and text mode. When the printing mode module exists in the color line art and text mode, the conversion module does not covert a detected color object to a converted reduced-colorant object when the detected color object is a color line art object and/or a color text object.

In yet another aspect of the present disclosure, the system can utilize a color graphics mode and a color solid fill mode. When the printing mode module exists in the color graphics mode, the conversion module does not convert a detected color object to the converted reduced-colorant object when the detected color object is a color graphics object. Similarly, when the printing mode module exists in the color solid fill mode, the conversion module does not convert the detected object to the converted reduced-colorant object when the detected color object is a color solid fill object.

In another aspect of the present disclosure, the system may further include a user selection component and/or a billing module. The user selection component may be in operative communication with the printing mode module and/or the conversion module. The user selection component can communicate a first user selection and/or a second user selection. The first user selection selects for the existence of a mode of the printing mode module. The second user selection selects such that the converted reduced-colorant object is one of a monochrome object, a two-colorant object, and a three-colorant object. The billing module can calculate a fee for printing the page based upon the existence of a mode (or modes) of the printing mode module.

In another aspect of the present disclosure, the system disclosed herein and the related method may be implemented by an operative set of processor executable instructions and may be configured for execution on one or more processors. Additionally or alternatively, the system can be an installable module. The installable module may be installable in a xerographic system, an electrostatographic system, a printing system, a photocopying system, or the like.

In another aspect of the present disclosure, a method for selectively printing color content of a page with a reduced color gamut is disclosed. The method includes the steps of detecting a color object in the page and selectively converting the detected color object to a converted reduced-colorant object in accordance with the existence of a mode (or modes) of a printing mode module. The mode of the printing mode module can be one or more of a reduced-colorant only mode, a full color mode, a color text mode, a color line art mode, a color line art and text mode, a color graphics mode, and a color solid fill mode, and similarly to the above system, the method can detect color contone objects, color text objects, color line art objects, color graphic objects, color low frequency halftone objects, color high frequency halftone objects, and color solid fill objects. The method may further include the step of determining the approximate area of coverage of the detected color object. The reduced-colorant object may be one of a monochrome object, a two-colorant object, or a three-colorant object.

BRIEF DESCRIPTION OF THE DRAWINGS

These and other advantages will become more apparent from the following detailed description of the various embodiments of the present disclosure with reference to the drawings wherein:

FIGS. 1A and 1B include graphic representations of pages with color objects in the pages;

DETAILED DESCRIPTION

Figure 1A:
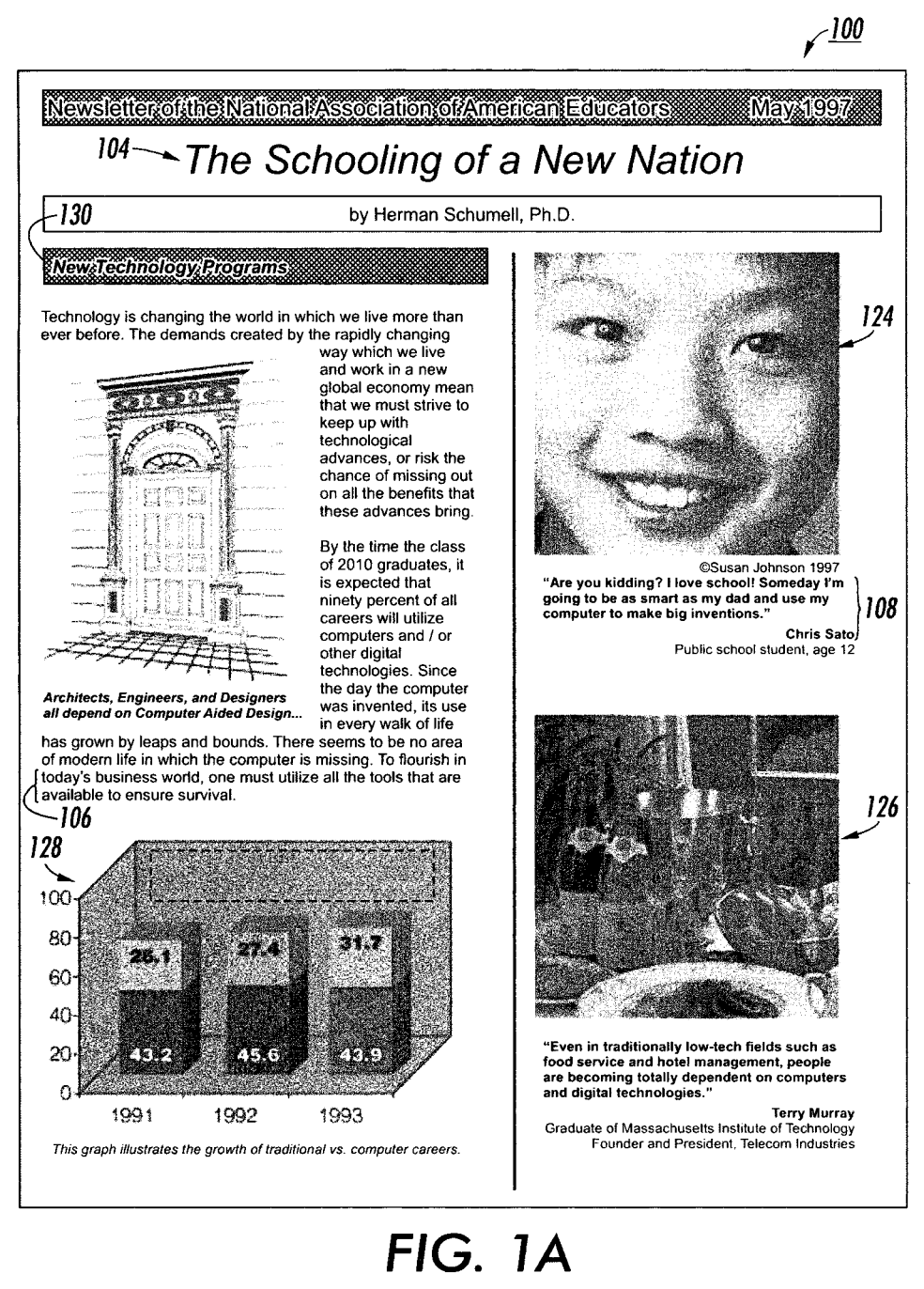
Figure 2:
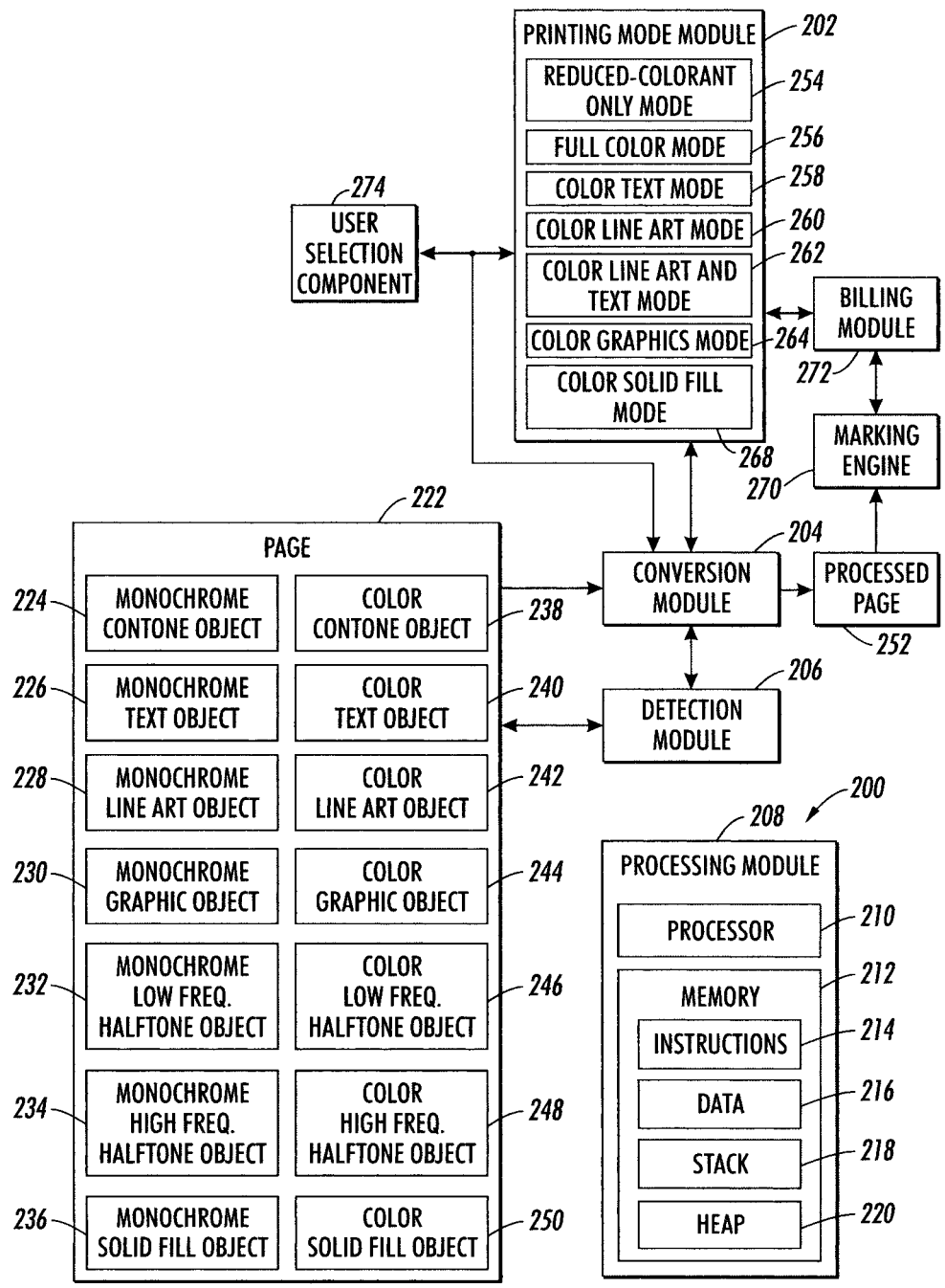
FIG. 2 is a block diagram illustrating a system for selectively printing color content of a page with a reduced color gamut and billing for the printed page based upon the printed content in accordance with the present disclosure.

FIGS. 1A and 1B show pages 100 and 102 that include monochrome and color objects. Page 100 includes color text objects 104, 106, and 108. Additionally, page 102 includes color text objects 110, 112, 114, 116, 118, 120, and 122. Page 100 also includes color high frequency halftone objects 124 and 126, color graphic object 128, and color line art object 130. Pages 100 and 102 contain a significant amount of monochrome objects as well.

One prior art system has only two mutually exclusive modes for printing page content. The prior art system either prints a color page in "full color" or in "monochrome only". These two ways of printing correspond to a full color mode and a monochrome only mode, respectively. In the full color mode, all of the color objects in the page were printed in color. In the monochrome only mode, all of the color objects were converted to monochrome objects before (or simultaneously with) marking the page on a substrate (e.g., printing a page on a sheet of paper).

These two prior art modes can be used in conjunction with any printing technology, including a computer printing system, a copying machine, a xerographic system, an electrostatographic system, a printing system, a photocopying system, or the like. Pages 100 and 102 can be printed using the prior art system that has only a full color and a monochrome only modes. However, many entities involved in color printing bill the pages depending on which mode is used to print the page. For example, a color page that is printed in full color may be billed at about $0.08 (U.S.) per page while a monochrome only printed page may be billed at about $0.01 (U.S.) per page.

Additionally, many of the entities that use the prior art system bill for a printed page based upon whether the page was printed in the monochrome only mode or the full color mode accordingly, regardless of the content of the page (e.g., types of objects in the page). Therefore, a page with some color text objects is billed at the same rate as a page with huge graphic objects and/or high frequency halftone objects. For example, pages 100 and 102 are billed at the same rate when printed using the full color mode despite that page 100 has significantly more complex color objects than compared to page 102, e.g., high frequency halftone objects 124 and 126 are included in page 100 and probabilistically incur additional service costs.

Because of the significant price difference between printing pages using the full color mode versus using the monochrome only mode, many system administrators of shared printing resources prevent users from printing in color or restrict their use. As mentioned above, printing color pages generally has an increased service cost as compared to printing monochrome pages. However, different types of color objects have different effects on the aggregate service cost. For example, printing a page having color text with the remainder of the page being in monochrome does not generally incur additional service costs as compared to printing a page in monochrome only. Additionally, color text objects do not use as much toner as compared to color graphic objects, and color high or low frequency halftone objects. Additionally, printing a color object with fewer than all of the colorants available is also cheaper than printing the object in full color, e.g., it is cheaper to print a color object with only 2 out of 4 colorants of the color gamut than printing the object with all 4 colorants.

Field data indicates that most of the service cost of printing color pages is related to printing a subset of the commonly used color objects. Specifically, color high and low frequency halftone objects, logos, and color solid fill objects tend to dominate the service cost incurred by printing color pages. Additionally, many of the raster image processing performance issues are related to printing complex color objects contained within a print job, which also generates several customer problems that increase service costs. However, there are substantially fewer instances of problems, and hence lower service costs, related to color texts objects and color line art objects.

Therefore, additional modes are disclosed herein that use less toner (or ink) and have less service cost associated with the printed color pages. These additional modes facilitate the implementation of a more robust billing strategy. For an illustration of these additional modes, refer to FIG. 2.

FIG. 2 is a block diagram illustrating a system 200 for selectively printing color content of a page with a reduced color gamut and billing for the printed page based upon the printed content in accordance with the present disclosure. System 200 includes printing mode module 202, conversion module 204, and detection module 206. System 200 may be implemented in hardware, software, software in execution, firmware, or some combination thereof. Additionally or alternatively, system 200 may be implemented by processing module 208 that includes processor 210 and memory 212. Memory 212 includes instructions 214, data 216, stack 218 and heap 220. Additionally or alternatively, system 200 may be implemented by instruction 214.

Page 222 is shown and includes monochrome contone object 224, monochrome text object 226, monochrome line art object 228, monochrome graphic object 230, monochrome low frequency halftone object 232, monochrome high frequency (abbreviated as "freq.") halftone object 234, monochrome solid fill object 236, color contone object 238, color text object 240, color line art object 242, color graphic object 244, color low freq. halftone object 246, color high freq. halftone object 248, and color solid fill object 250. Also, page 222 may be representative of any page (e.g., pages 100 and 102 of FIGS. 1A and 1B) and is used only to illustrate some of the variety of objects that can be detected by detection module 206 and used by system 200; however, system 200 may use a page that includes any combinations of objects or no objects.

Detection module 206 can detect one or more of objects 224 through 250 and is in communication with conversion module 204. Additionally or alternatively, detection module 206 can count the number of pixels of the detected object during ripping or autowindowing to facilitate billing based upon the area of coverage of objects 224 through 250 as well. Also, detection module 206 can detect objects during autowindowing. The autowindowing technique is described in the U.S. Pat. No. 5,850,474 entitled, "Apparatus and method for segmenting and classifying image data" and U.S. Pat. No. 6,240,205 entitled, "Apparatus and method for segmenting and classifying image data", both of which are assigned to the present assignee and are hereby incorporated by reference.

Conversion module 204 can convert one or more of color objects 224 through 236 resulting in processed page 252. Processed page 252 may be similar or identical to page 222, but processed page 252 may contain one or more of color objects 238 through 250 that are converted to a respective reduced-colorant object by conversion module 204. For example, conversion module 204 can convert color low freq. halftone object 246 to a converted reduced-colorant low freq. halftone object (not depicted in processed page 252). A reduced-colorant object is an object that is printed using less than all of the available colorants, e.g., using cyan, magenta, and black, and not using yellow when the printing system has a CMYK color gamut. A monochrome object is an object that is printed (or contained within a page) using a single colorant, e.g., black and white, and/or grayscale.

Conversion module 204 can selectively convert one of the color objects 238 through 250 depending on the existence of one or more modes within printing mode module 202. The possible printing modes of printing mode module 202 are reduced-colorant mode 254, full color mode 256, color text mode 258, color line art mode 260, color line art and text mode 262, color graphics mode 264, and color solid fill mode 268. Although modes 254 through 268 are depicted within printing mode module 202, this depiction is only to illustrate that more than one mode may be in existence rather than all of the depicted modes always being in existence. Additionally or alternatively, modes 254 through 268 may or may not be mutually exclusive. For example, color graphics mode 264 may be in existence simultaneously with color text mode 258. However, the existence of reduced-colorant only mode 254 may be mutually exclusive to the existence of full color mode 256.

Conversion module 204 converts all color objects (e.g., color objects 238 through 250) to a corresponding converted reduced-colorant object (not depicted in processed page 252) regardless of the color object type, when the printing mode module 202 has reduced-colorant only mode 254 in existence. Also, conversion module 204 does not convert any color objects to a corresponding reduced-colorant object when printing mode module 202 has full color mode 256 in existence.

Color text mode 258, when in existence, is communicated to conversion module 204 via interaction with printing mode module 202 ensuring that conversion module 204 does not convert color text object 240 to a converted reduced-colorant text object (not depicted within processed page 252). Likewise, color line art mode 260, when in existence causes conversion module 204 not to convert a color line art object to a reduced-colorant object, e.g., color line art object 242. Color line art and text mode 262 ensures that any color line art objects or color text objects (e.g., color line art object 242 and color text object 240) are not converted to corresponding converted reduced-colorant objects.

Color graphics mode 264 and color solid fill mode 268 ensure that conversion module 204 does not convert a color graphic object or a color solid fill object, respectively, to corresponding reduced-colorant objects.

Therefore, conversion module 204 selectively converts color objects 238 through 250, based upon the object type and the existence of one or more of modes 254 through 268 of printing mode module 202. The resulted page is processed page 252 that can be marked on a substrate by marking engine 270. Marking engine 270 may be part of a xerographic system, an electrostatographic system, a printing system, and/or a photocopying system.

Billing module 272 calculates a fee for printing processed page 252 based upon the existence of one or more of modes 254 through 268. For example, consider that color line art and text mode 262 is in existence and page 222 is processed by conversion module 204 resulting in processed page 252. In this example, page 222 has color contone object 238, color graphic object 244, color low freq. halftone object 246, color high freq. halftone object 248, and color solid fill object 250 converted to a reduced-colorant contone object, a reduced-colorant graphic object, a reduced-colorant low freq. halftone object, a reduced-colorant high freq. object, and a reduced-colorant solid fill object, respectively, contained within processed page 252. However, in this example, conversion module 204 did not change color text object 240 or color line art object 242; and both are contained in their original color within processed page 252 for printing on a substrate using marking engine 270. In this example, billing mode module 272 calculates an intermediate fee between the cheapest fee of printing a monochrome only page and the most expensive fee that is used when printing a full color page. This intermediate fee is based upon the existence of color line art and text mode 262, facilitating a more robust billing scheme and/or whether each of the color objects 238 through 250 are converted to a respective monochrome object, two-colorant object, and/or three-colorant object.

Additionally or alternatively, user selection component 274 gives a user the ability to select for the existence of one or more of modes 254 through 268. For example, user selection component 274 may be a software component that a network administrator can configure for allowing a user of the network to have the ability to print a certain number of full color, color line art and text, and reduced-colorant only pages. Additionally or alternatively, user selection component 274 may include a button on the face of a printing system enabling a user to select one or more of modes 254 through 268. User selection component 274 may also allow a user to select whether or not the converted reduced-colorant object is converted to a respective monochrome object, two-colorant object, or three-colorant object While referring simultaneously to FIGS. 1A and 2, also consider the following example. Page 100 includes color text objects 104, 106 and 108. Page 100 also includes color high freq. halftone objects 124 and 126, and color graphic 128. For exemplary purposes only, assume that printing mode module 202 of FIG. 2 has only the color line art and text mode 262 in existence. Page 100 can be processed by conversion module 204 resulting in a processed page (e.g., similar to processed page 252). Because printing mode module 202 has only color line art and text mode 262 in existence, color high frequency halftone objects 124 and 126 are converted to two converted reduced-colorant high freq. halftone objects during (or before) printing page 100 onto a substrate. By using this mode, page 100 is printed in such a manner as to avoid printing objects that are more likely to incur service costs, but still has some color objects. Various other combinations are possible as well.

Figure 3:
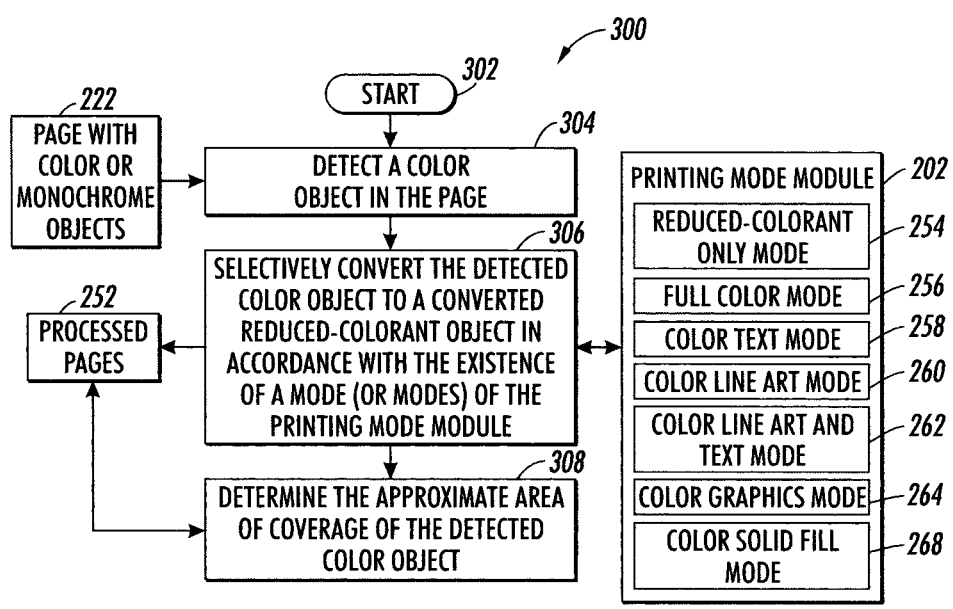
FIG. 3 is a flow chart diagram illustrating a method for selectively printing color content of a page with a reduced color gamut in accordance with the present disclosure.

Referring to the drawings, FIG. 3 is a flow chart diagram of a method 300 for selectively printing color content of a page with a reduced color gamut. Method 300 starts at step 302 and can detect a color object in the page (e.g., page 222) during step 304. Step 306 can selectively convert the detected color object to a converted reduced-colorant object in accordance with the existence of a mode (or modes) of printing mode module 202. The converted reduced-colorant object may one of a monochrome object, a two-colorant object, or a three-colorant object. Step 306 can result in processed page 252. Step 308 can determine the approximate area of coverage of the detected color object. Step 308 may determine the approximate area of coverage of one or more detected color objects by counting the number of pixels of the detected object. Additionally or alternatively, step 308 may occur during ripping and/or during using the autowindowing technique mentioned supra.

During typical computer printing jobs, the area of coverage of a detected object is easily determined by counting the number of pixels during ripping. For photocopy jobs, it is more efficient to use the autowindowing technique discussed supra. Additionally, step 304 can use the autowindowing technique discussed above to differentiate between differing types of objects (e.g., text objects from line art objects). Using the windowed areas, method 300 (or system 200) can selectively convert the windowed objects to reduced-colorant object and leave the non-windowed regions to be reproduced as accurately as possible (or vice versa in another embodiment).

In the embodiments discussed in detail supra, only the CMYK color gamut was mentioned; however, it is envisioned that in other embodiments with other color gamuts may be used. For example, a color object based off of a color gamut having 'N' colorants may be converted to reduced-colorant object using only 'M' number of colorants in the color gamut as long as M<N. In the examples, we have mentioned about automatic conversion of color objects to monochrome, but this idea can be applied to convert any 'N' colorant printing mode to 'M' colorant printing mode as long as M<N. In the CMYK color gamut example used, M is 1 and N is 4 and, e.g., M may be 1 when the converted reduced-colorant object is a monochrome object.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for selectively printing color content of a page with a reduced color gamut, comprising:
    a detection module configured to detect a color object among a plurality of color objects in the page based upon the object type of the color object;
    a printing mode module existing in at least one mode;
    a conversion module configured to selectively convert, based on the object type, the detected color object of the plurality of color objects to a converted reduced-colorant object thereby having a reduced color gamut in accordance with the existence of the at least one mode of the printing mode module, wherein the conversion module generates a processed page having the converted reduced-colorant object and any non-converted objects of the plurality of objects;
    a user selection component in operative communication with at least one of the printing mode module and the conversion module, wherein the user selection component is configured to communicate a user selection, wherein in response to the user selection, the conversion module selectively converts the detected color object to the converted reduced-colorant object by reducing a number of colorants used to render the color object to a predetermined number of colorants based upon the object type of the color object;

a marking engine in operative communication with the conversion module to receive the processed page, wherein the marking engine marks a substrate in accordance with the processed page; and a billing module configured to calculate three or more different fees that each corresponds to a different mode of the printing module for printing the page with the converted reduced-colorant object.

2. The system according to claim 1, wherein the at least one mode includes at least one of a reduced-colorant only mode, a color text mode, a color line art mode, a color line art and text mode, a color graphics mode, and a color solid fill mode.

3. The system according to claim 1, wherein the converted reduced-colorant object is one of a monochrome object, a two-colorant object, and a three-colorant object.

4. The system according to claim 1, wherein the color object in the page is one of a color contone object, a color text object, a color line art object, a color graphic object, a color low frequency halftone object, a color high frequency halftone object, and a color solid fill object.

5. The system according to claim 1, wherein the printing mode module exists in a reduced-colorant only mode, wherein the conversion module converts the detected color object to the converted reduced-colorant object, the conversion module acting in accordance with the printing mode module.

6. The system according to claim 1, wherein the printing mode module exists in a color text mode, wherein the conversion module does not convert another color object of the plurality of color objects to another converted reduced-colorant object when the another color object is a color text object, the conversion module acting in accordance with the printing mode module.

7. The system according to claim 1, wherein the printing mode module exists in a color line art mode, wherein the conversion module does not convert another color object of the plurality of color objects to another converted reduced-colorant object when the another color object is a color line art object, the conversion module acting in accordance with the printing mode module.

8. The system according to claim 1, wherein the printing mode module exists in a color line art and text mode, wherein the conversion module does not convert another color object of the plurality of color objects to another converted reduced-colorant object when the another color object is one of a color line art object and a color text object, the conversion module acting in accordance with the printing mode module.

9. The system according to claim 1, wherein the printing mode module exists in a color graphics mode, wherein the conversion module does not convert another color object of the plurality of color objects to another converted reduced-colorant object when the another color object is a color graphic object, the conversion module acting in accordance with the printing mode module.

10. The system according to claim 1, wherein the printing mode module exists in a color solid fill mode, wherein the conversion module does not convert another color object of the plurality of color objects to the converted reduced-colorant object when the detected color object is a color solid fill object, the conversion module acting in accordance with the printing mode module.

11. The system according to claim 1, wherein the page is one of a scanned page, an image of a page, a page description language page, a printed page, a copied page, a computer-memory based page, a hard-drive based page, a raster page, and a vector graphics page.

12. The system according to claim 1, wherein the converted reduced-colorant object is in a windowed region of the page that is determined during auto windowing on the page.

13. The system according to claim 1, wherein the detection, printing mode, and conversion modules are an installable module installable in at least one of a xerographic system, an electrostatographic system, a printing system, and a photocopying system.

14. The system according to claim 1, further comprising a xerographic system including the marking engine.

15. The system according to claim 1, further comprising a electrostatographic system including the marking engine.

16. The system according to claim 1, further comprising a printing system including the marking engine.

17. The system according to claim 1, further comprising a photocopying system including the marking engine.

18. The system according to claim 1, wherein the fees calculated by the billing module differ according to a reduced-colorant mode, a full color mode, color text mode, color line art mode, color line art and text mode, color line art mode, a color graphics mode and color sold fill mode of the printing module and based upon the color objects in the page being converted to a monochrome object, a two-colorant object, and a three-colorant object.

19. The system according to claim 1, wherein the fees comprises a first fee when in full color mode, a second fee that is less than the first fee when printing monochrome only, and a third intermediate fee that is between the first fee and the second fee.

20. A method for selectively printing color content of a page with a reduced color gamut, comprising the steps of:
    detecting a color object in the page among a plurality of color objects; and
    selectively converting the detected color object to a converted reduced-colorant object based upon the object type of the color object, the converted reduced-colorant object corresponding to a reduced color gamut, wherein the selectively converting step occurs in accordance with the existence of at least one mode of a printing mode module;
    selecting, by a user, a mode of the at least one mode such that the selective conversion step selectively converts the detected color object to the converted reduced-colorant object by reducing a number of colorants used to render the color object to a predetermined number of colorants based upon the object type of the color object; and
    calculating three or more different fees that each corresponds to a different mode of the printing module for printing the page with the converted reduced-colorant object.

21. The method according to claim 20, wherein the selected mode includes at least of a reduced-colorant only mode, a color text mode, a color line art mode, a color line art and text mode, a color graphics mode, and a color solid fill mode.

22. The method according to claim 20, wherein the color object in the page is one of a color contone object, a color text object, a color line art object, a color graphic object, a color low frequency halftone object, a color high frequency halftone object, and a color solid fill object.

23. The method according to claim 20, wherein the converted reduced-colorant object is one of a monochrome object, a two-colorant object, and a three-colorant object.

24. The method according to claim 20, further comprising marking the converted reduced-colorant object on a substrate using a marking engine.

25. The method according to claim 20, further comprising calculating a different fee with a billing module for a reduced-colorant mode, a full color mode, color text mode, color line art mode, color line art and text mode, color line art mode, a color graphics mode and color sold fill mode and based upon whether each of the color objects of the plurality of color objects in the page are converted to a respective monochrome object, a two-colorant object, and a three-colorant object.

* * * * *